(12) United States Patent
Kawaguchi et al.

(10) Patent No.: US 8,285,417 B2
(45) Date of Patent: Oct. 9, 2012

(54) ROBOT AND TASK EXECUTION SYSTEM

(75) Inventors: Yuichiro Kawaguchi, Wako (JP);
Katsuyoshi Watari, Wako (JP); Taro Yokoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 12/681,818

(22) PCT Filed: Oct. 7, 2008

(86) PCT No.: PCT/JP2008/002825
§ 371 (c)(1),
(2), (4) Date: Apr. 6, 2010

(87) PCT Pub. No.: WO2009/072228
PCT Pub. Date: Jun. 11, 2009

(65) Prior Publication Data
US 2010/0217438 A1    Aug. 26, 2010

(30) Foreign Application Priority Data

Dec. 4, 2007    (JP) ................................ 2007-313055

(51) Int. Cl.
*G05B 19/418* (2006.01)
*G06F 19/00* (2011.01)
*G05B 19/18* (2006.01)

(52) U.S. Cl. ........ 700/248; 700/245; 700/246; 700/250; 700/253; 700/254; 700/258; 700/259; 700/26; 700/261; 700/262

(58) Field of Classification Search .................. 700/245, 700/246, 248, 250, 253, 254, 258, 259, 260, 700/261, 262, 264; 701/23, 24, 26, 301; 702/182; 706/12, 45, 48, 903, 905, 919; 716/102, 45, 48, 903, 905, 919; 718/104
See application file for complete search history.

(56) References Cited

U.S. PATENT DOCUMENTS 7,463,948 B2 * 12/2008 Orita .............................. 700/245
7,765,028 B2 *  7/2010 Orita .............................. 700/248
(Continued)

FOREIGN PATENT DOCUMENTS

JP            2003-291083        10/2003
(Continued)

OTHER PUBLICATIONS

European Search Report dated Jan. 7, 2011 (corresponds to European patent application 08857946.1).

*Primary Examiner* — Ian Jen
(74) *Attorney, Agent, or Firm* — Rankin, Hill & Clark LLP

(57) ABSTRACT

A robot and the like capable of executing a task in an appropriate condition from the viewpoint of execution economy even when a state of the task is altered. A cost is evaluated that represents a load or labor required for a robot (1) to execute a new task, and the cost information indicating the cost is transmitted to a support server (200) (bid procedure). The support server (200) designates the robot (1) having the lowest cost as a designated robot (1) and transmits an execution instruction for executing the new task to the designated robot (1). The robot (1) executes the task according to the execution instruction (contract procedure). By employing the task bid and contract system, a designated task is executed by an adequate robot (R) among a plurality of robots (R) in consideration of the execution economy of the designated task.

18 Claims, 10 Drawing Sheets

U.S. PATENT DOCUMENTS

| | | | |
|---|---|---|---|
| 2003/0171846 A1* | 9/2003 | Murray et al. | 700/245 |
| 2005/0021186 A1* | 1/2005 | Murray et al. | 700/245 |
| 2005/0057689 A1* | 3/2005 | Sakagami | 348/460 |
| 2005/0085948 A1* | 4/2005 | Herr et al. | 700/258 |
| 2005/0197741 A1* | 9/2005 | Sabe et al. | 700/245 |
| 2005/0256610 A1* | 11/2005 | Orita | 700/248 |
| 2006/0095160 A1* | 5/2006 | Orita et al. | 700/248 |
| 2006/0265103 A1* | 11/2006 | Orita | 700/245 |

FOREIGN PATENT DOCUMENTS

| | | |
|---|---|---|
| JP | 2003-345435 | 12/2003 |
| JP | 2005-324278 | 11/2005 |
| JP | 2006-007341 | 1/2006 |
| JP | 2006-231421 | 9/2006 |
| JP | 2006-326703 | 12/2006 |
| JP | 2007-245317 | 9/2007 |

* cited by examiner

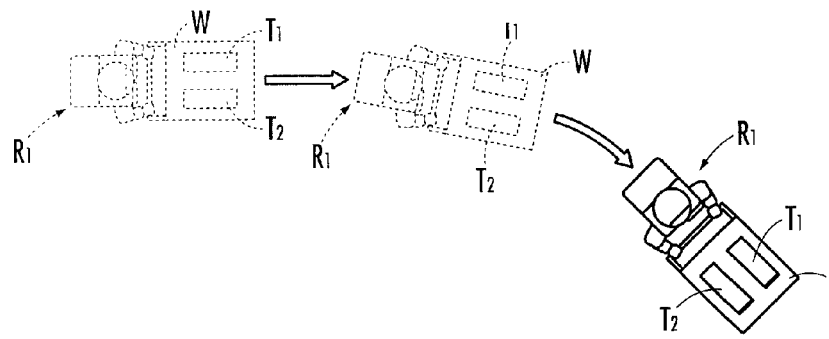
FIG.9 (a) FIRST TASK
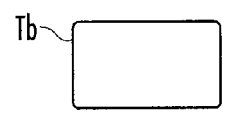
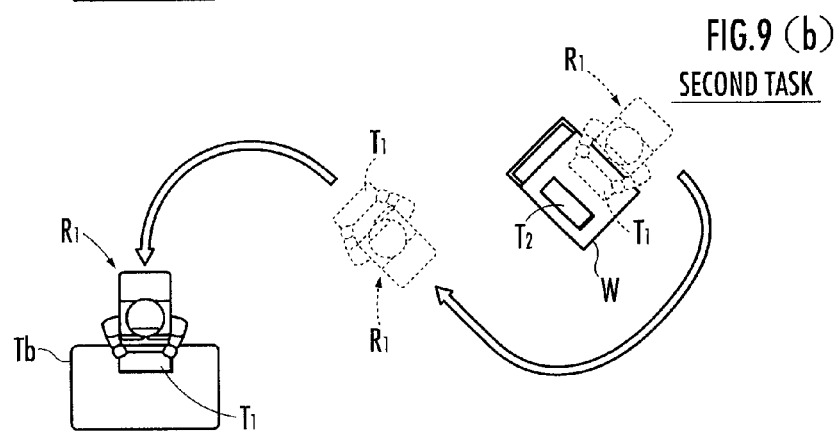
FIG.9 (b) SECOND TASK
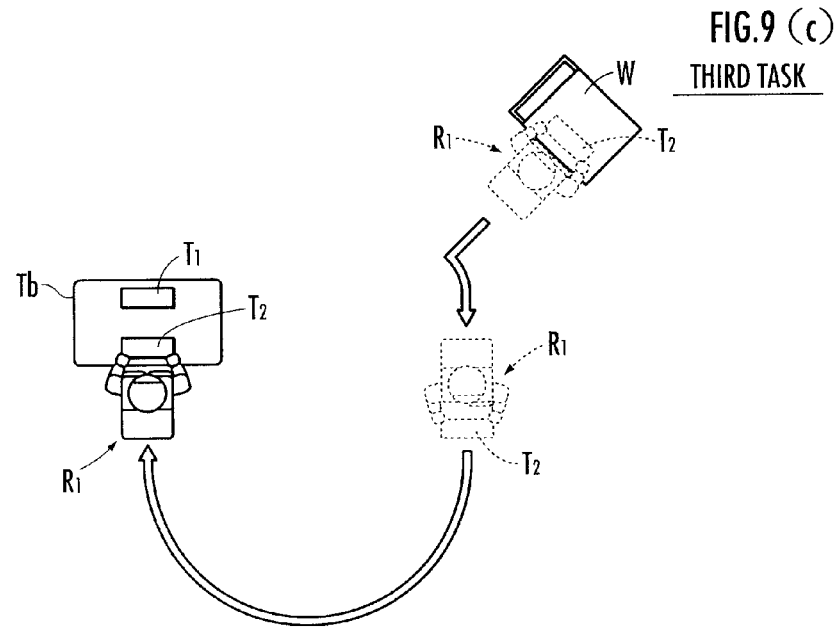
FIG.9 (c) THIRD TASK

ROBOT AND TASK EXECUTION SYSTEM

PRIORITY CLAIM

The present application is based on and claims the priority benefit of Japanese Patent Application 2007-313055 filed on Dec. 4, 2007, the contents of which are incorporated herein by reference in its entirety.

BACKGROUND OF THE INVENTION

1. Field of the Invention

The present invention relates to a robot or the like executing a task by making autonomous motions.

2. Description of the Related Art

Trials have been made on a robot by applying various functions such as environment-recognizing function or autonomous moving function to the robot so as to make it execute tasks such as transporting luggage, locomotive road-guiding and the like. When there are a plurality of robots having such functions present in an environment, it is necessary to construct an execution plan to assign tasks to appropriate robots from the viewpoint of performing the tasks efficiently. Thus, there has been disclosed a technical approach for assigning each task to an appropriate robot according to a priority level or an execution cost of each task (refer to Japanese Patents Laid-open No. 2005-324278 and No. 2006-326703).

However, generally, it is necessary to execute a new unscheduled task, or a state of a task may vary, for example, a content of a scheduled task may be altered. Also, it is considerable that a task may vary from an unassigned state to an assigned state of being executed. Moreover, a state of a robot may vary, for example, the robot may change its position when executing a task. Thus, when the state of a task varies, it is impossible to make each robot execute the task efficiently if the state of each robot is not known correctly. In this regard, central controlling the states of robots in a server may be raised as one of solutions.

Nevertheless, due to increased communication information amount between the server and the robots and the heavy information processing load for recognizing the states of the plurality of robots controlled by the server, the states of the robots may vary massively during the information communication and the information processing, and consequently, it is possible that an execution instruction for a task issued from the server to each robot is inappropriate from the viewpoint of performing the task efficiently.

SUMMARY OF THE INVENTION

The present invention has been accomplished in view of the aforementioned problems, and it is therefore an object of the present invention to provide a robot and the like capable of executing a task in an appropriate condition from the viewpoint of execution economy even when a state of the task is altered.

A first aspect of the present invention provides a robot which executes a task by making autonomous motions according to communication with a support server provided with a task database. The robot comprises: a first processing element configured to recognize a content of a designated task among a plurality of tasks stored in the task database according to communication with the support server, to evaluate a cost indicating a labor or load required for a self robot to execute the designated task according to the recognition result, and to store the evaluated cost in the task database according to communication with the support server; and a second processing element configured to recognize whether the cost of the self robot stored in the task database according to communication with the support server is the lowest in a robot group containing other robots, and to control the motions of the self robot so as to execute the designated task on a condition that the cost thereof has been recognized to be the lowest.

According to the robot of the first aspect of the present invention, the cost indicating the labor or load required for a robot to execute the designated task is evaluated and the cost evaluated for each robot is stored in the task database disposed in the support server. When it is recognized that the cost of a self robot is the lowest in the plurality of robots stored in the task database, the self robot is controlled to execute the designated task. The evaluation of the cost for the plurality of robots and the storage thereof in the task database of the support server may be deemed as a bid for executing the designated task by the plurality of robots with the cost as a bid price. The execution of the designated task by a robot with the lowest cost in the plurality of robots may be deemed as a contract for executing the designated task by the robot. Through performing the bid and contract of the designated task, the designated task can be executed by an appropriate robot in the plurality of robots from the viewpoint of execution economy of the designated task. Thereby, the robot can execute the designated task in an appropriate condition from the viewpoint of execution economy of the task even though the state thereof is altered.

A second aspect of the present invention is dependent on the first aspect of the robot of the present invention, wherein the first processing element recognizes an execution starting time for the designated task as the content of the designated task, and evaluates the cost predicted for executing the designated task at the execution starting time.

According to the robot of the second aspect of the present invention, through performing the bid and contract of the designated task according to the cost evaluated in relation to a predicted future state of a robot, the robot can execute the designated task in an appropriate condition from the viewpoint of execution economy of the task.

A third aspect of the present invention is dependent on the first aspect of the robot of the present invention, wherein the first processing element recognizes an execution starting position and an execution ending position for the designated task as the content of the designated task, determines a position of the robot, calculates a travel distance from the determined position of the robot to the execution starting position or the execution ending position of the designated task, and evaluates the cost higher continuously or discontinuously as the travel distance becomes longer.

According to the robot of the third aspect of the present invention, when a robot has the travel distance starting from the execution starting position of the designated task or passing through the execution starting position of the designated task to the execution ending position thereof is shorter than another robot, the robot can execute the designated task by priority over the other robot. On the contrary, when the travel distance is longer than the travel distance by another robot, the robot is prevented from executing the designated task. Thereby, the robot can execute the designated task in an appropriate condition from the viewpoint of shortening the travel distance for executing the designated task.

A fourth aspect of the present invention is dependent on the first aspect of the robot of the present invention, wherein the first processing element recognizes whether the robot is executing another task different from the designated task, and evaluates higher the cost required for executing the designated task if it is recognized that the robot is executing the other task than the cost required for executing the designated task if it is recognized that the robot is not executing the other task.

According to the robot of the fourth aspect of the present invention, the robot can execute the designated task when the robot is not executing another task different from the designated task by priority over when the robot is executing the other task.

A fifth aspect of the present invention is dependent on the fourth aspect of the robot of the present invention, wherein the first processing element recognizes a priority level of the designated task as the content thereof, recognizes whether the priority level of the designated task is higher than the priority level of the other task further after it is recognized that the robot is executing the other task, and evaluates higher the cost if it is recognized that the priority level of the designated task is lower than the priority level of the other task than the cost if it is recognized that the priority level of the designated task is higher than the priority level of the other task.

According to the robot of the fifth aspect of the present invention, when another task is in execution, if the priority level of the other task is lower than the priority level of the designated task, the designated task can be executed. Thereby, the robot can execute the designated task in an appropriate condition from the viewpoint of executing a task with higher priority level by priority.

A six aspect of the present invention is dependent on the fourth aspect of the robot of the present invention, wherein the first processing element further recognizes whether a remained part of the other task is equal to or greater than a reference value after it is recognized that the other task is being executed, and evaluates higher the cost if it is recognized that the remained part of the other task is less than the reference value than the cost if it is recognized that the remained part of the other task is equal to or greater than the reference value.

According to the robot of the sixth aspect of the present invention, even another task different from the designated task is being executed, however, if the other task can be completed in a short duration, the robot can be assigned to execute the designated task. Thereby, the robot can execute the designated task in an appropriate condition from the viewpoint of efficiently executing the task being executed and the designated task continuously.

A seventh aspect of the present invention is dependent on the first aspect of the robot of the present invention, wherein the first processing element recognizes a designated robot which is an execution subject of the designated task as the content thereof, further recognizes whether the robot corresponds to the designated robot, and evaluates higher the cost if it is recognized that the robot corresponds to the designated robot than the cost if it is recognized that the robot does not correspond to the designated robot.

According to the robot of the seventh aspect of the present invention, the robot can execute the designated task in an appropriate condition for the execution subject of the designated task in consideration of a specification or the like.

An eighth aspect of the present invention is dependent on the first aspect of the robot of the present invention, wherein the first processing element estimates an energy residual of the robot after the execution of the task, and evaluates the cost higher continuously or discontinuously as the energy residual becomes less.

According to the robot of the eighth aspect of the present invention, when a robot has more energy residual estimated after executing the designated task, the robot can execute the designate by priority over the other robot with less energy residual. On the contrary, when a robot has less energy residual than the other robot, the robot can be prevented from executing the designated task. Thereby, the robot can execute the designated task in an appropriate condition from the viewpoint of assuring sufficient energy for executing a new task after the execution of the designated task.

A ninth aspect of the present invention is dependent on the first aspect of the robot of the present invention, wherein the first processing element evaluates the cost of a scheduled execution task for the robot when the designated task has been executed and the cost of the scheduled execution task for the robot when the designated task is not executed after an execution duration of the designated task, respectively, evaluates the cost of the designated task higher continuously or discontinuously as the cost of the scheduled execution task when the designated task has been executed becomes higher than the cost of the scheduled execution task when the designated task is not executed, and evaluates the cost of the designated task lower continuously or discontinuously as the cost of the scheduled execution task when the designated task has been executed becomes lower than the cost of the scheduled execution task when the designated task is not executed.

According to the robot of the ninth aspect of the present invention, if the cost of the scheduled execution task when the designated task has been executed becomes lower than the cost of the scheduled execution task when the designated task is not executed, the robot can execute the designated task by priority over the case where the cost becomes higher. On the other hand, if the cost of the scheduled execution task when the designated task is not executed becomes lower than the cost of the scheduled execution task when the designated task has been executed, the robot can execute the designated task by priority over the case where the cost becomes higher. Thereby, the robot can execute the designated task before the scheduled execution task in an appropriate condition from the viewpoint of executing the schedule execution task at a lower cost.

A tenth aspect of the present invention is dependent on the first aspect of the robot of the present invention, wherein the first processing element stores the cost in the task database on a condition that the cost is equal to or greater than a first threshold.

According to the robot of the tenth aspect of the present invention, the self robot performs the bid for the designated task on a condition that the cost indicating the labor or load required for the self robot to execute the designated task is equal to or less than the first threshold. Thereby, each robot can be prevented from executing the designated task in spite of over-labor or over-load.

An eleventh aspect of the present invention is dependent on the first aspect of the robot of the present invention, wherein the first processing element evaluates the labor or load required for the self robot to execute a scheduled execution task as a second cost, and stores the content of the scheduled execution task as the content of the designated task in the task database according to communication with the support server on a condition that the second cost is equal to or higher than a second threshold.

According to the robot of the eleventh aspect of the present invention, the content of a scheduled task will be stored in the task database as the content of the designated task on a condition that the second cost indicating the labor required for the self robot to execute the scheduled task is equal to or more than the second threshold. Thereafter, as aforementioned, by performing the bid and the contract for the designated task by each robot, the designated task can be executed by another robot appropriately from the viewpoint of execution economy. Thereby, a task possibly consuming a great labor from the self robot may be executed by another robot in place of the self robot.

A twelfth aspect of the present invention is a task execution system comprising: a support server provided with a task database, and a plurality of robots executing a task by making autonomous motions according to communication with the support server, wherein the task database is stored with a content of each task among a plurality of tasks, the robot is provided with a controller, and the controller includes a first processing element configured to recognize a content of a designated task among a plurality of tasks stored in the task database according to communication with the support server, to evaluate a cost indicating a labor or load required for a self robot to execute the designated task according to the recognition result, and to store the evaluated cost in the task database according to communication with the support server; and a second processing element configured to recognize whether the cost of the self robot stored in the task database according to communication with the support server is the lowest in a robot group containing other robots and to control the motions of the self robot so as to execute the designated task on a condition that the cost thereof has been recognized to be the lowest.

According to the task execution system of the twelfth aspect of the present invention, the designated task can be executed by an appropriate robot among the plurality of robots in consideration of the execution economy of the designated task by performing the bid and the contract for the designated task.

BRIEF DESCRIPTION OF THE DRAWINGS

FIG. 9(a), FIG. 9(b) and FIG. 9(c) are diagrams related to designated tasks, respectively.

DETAILED DESCRIPTION OF THE PREFERRED EMBODIMENTS

Figure 1:
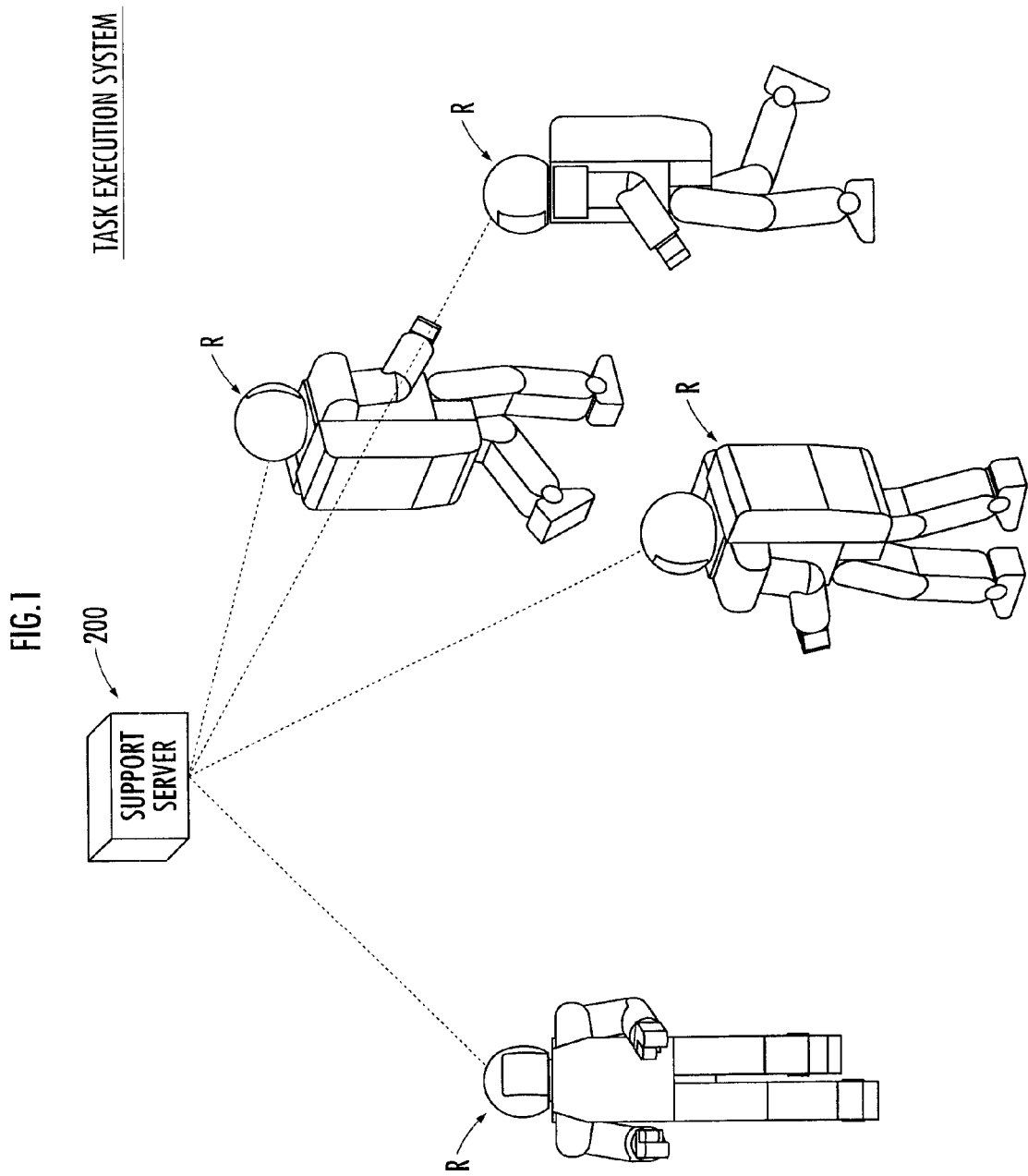
FIG. 1 is a schematic diagram illustrating a task execution system of the present invention.
Figure 2:
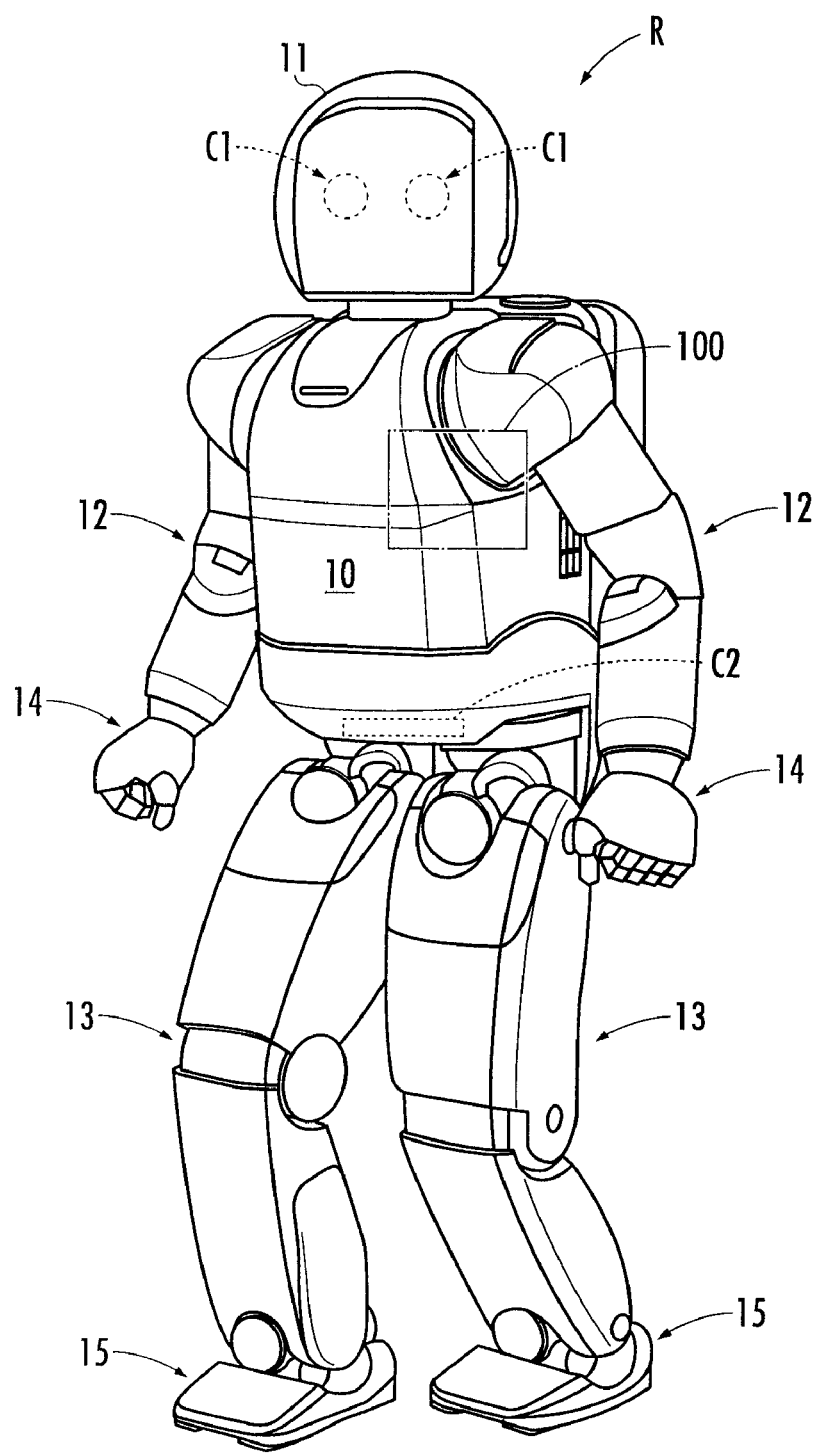
FIG. 2 is a schematic diagram illustrating a robot of the present invention.

Hereinafter, embodiments of a task execution system of the present invention will be described in detail with reference to the drawings. The task execution system illustrated in FIG. 1 is composed of a plurality of robots R and a support server 200. The robot R illustrated in FIG. 2 is provided with a body 10, a head 11 disposed at an upper portion of the body 10, a pair of left and right arms 12 extended from both lateral sides of the upper portion of the body 10, a hand 14 disposed at an end portion of the arm 12, a pair of left and right legs 13 extended downward from a lower portion of the body 10, and a foot 15 attached to an end portion of the leg 13. As disclosed in domestic re-publications of PCT international application 03/090978 and 03/090979, according to a force transmitted from the actuator 1000 (refer to FIG. 2), the robot R can stretch and bend the arm 12 or the leg 13 at a plurality of joints equivalent to a plurality of joints of a human, such as a shoulder joint, an elbow joint, a wrist joint, a hip joint, a knee joint, an ankle joint and so forth. The robot R can autonomously move according to iterated motions of stepping on ground and leaving off ground of the left and right legs 13 (or the feet 15), respectively. The height of the head 11 can be adjusted through adjusting an inclined angle relative to the vertical direction of the body 10. The head 11 is mounted with a pair of head cameras (CCD camera) $C_1$. The pair of head cameras $C_1$ are laterally disposed and directed to the front of the robot R. The body 10 is mounted with a waist camera (infrared camera) $C_2$ at a lower portion of the front side thereof. In addition to the robot R which moves autonomously according to the motions of the plurality of legs 13, any device which is movable, such as a wheel-type moving robot (automobile), may be used as a motion device.

The robot R is provided with a controller 100 and a communication device 102. The controller 100 is comprised of an ECU or a computer (comprising a CPU, a ROM, a RAM, an I/O and the like) as hardware. A control program (software) is stored in a memory of the computer. The control program may be installed in the computer via a software-recording medium such as a CD or a DVD. The control program may also be downloaded from a server via a network or a satellite to the computer every time when there is a request transmitted from the robot R to the server.

Figure 3:
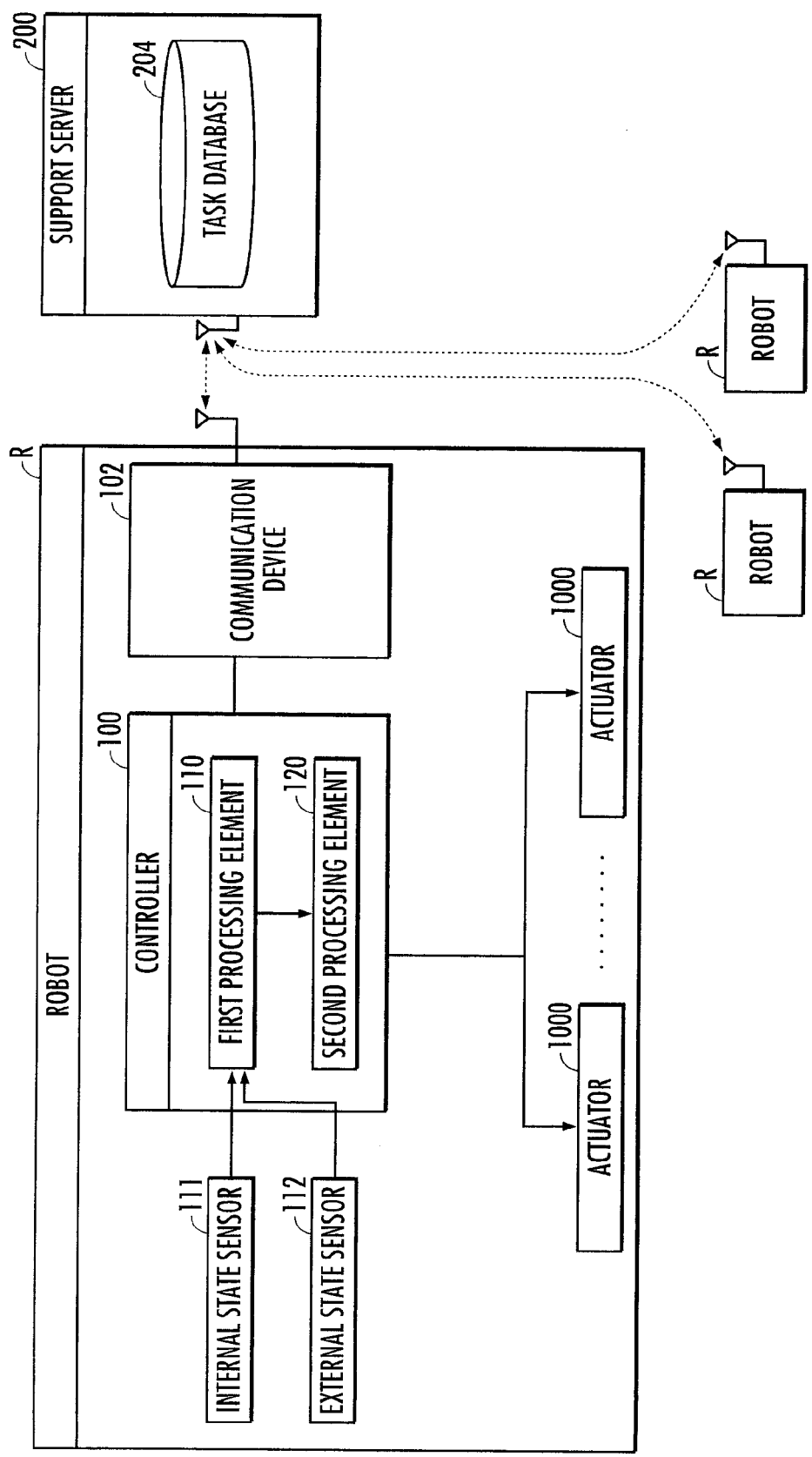
FIG. 3 is a block diagram illustrating a controller of the robot and a support server.

The controller 100 illustrated in FIG. 3 controls the motions of the arms 12 and the legs 13 through controlling an actuator 1000 on the basis of output signals from an internal state sensor 111 and an external state sensor 112.

The internal sensor 111 is configured to determine an internal state or a behavior state of the robot R. The internal state sensor 111 may be of various sensors mounted on the robot R, such as a gyro sensor which outputs a signal in relation to an acceleration of the body 10, a rotary encoder which outputs a signal in relation to a joint angle of each joint, a force sensor or the like which outputs a signal in relation to a floor reactant force acted on the legs 13. The external state sensor 112 is configured to determine a behavior state or the like of an object and an external state or an environment of the robot R. The head camera $C_1$, the waist camera $C_2$ and so forth are equivalent to the external state sensor 112. In addition to a driving source such as an electric motor, the actuator 1000 is composed of a reduction gear disposed between an output shaft of the driving source and a link constituting the arm 12 or the leg 13, and a flexible element such as an elastic member. The controller 100 includes a first processing element 110 and a second processing element 120. Note that "a component of the present invention "recognizes" information" means that the component performs a possible information processing on a piece of information to prepare the piece of information ready for other information processing, for example, the component searches a piece of information in a database or retrieves the piece of information from a storing device such as a memory or the like; measures, calculates, estimates, determines a piece of information on the basis of output signals from a sensor or the like; and stores in memory or the like the determined information or the like.

The first processing element 110 is configured to recognize a content of a designated task among a plurality of tasks stored in the task database 204 according to communication with the support server 200, to evaluate a cost indicating a labor or load required for the self robot R to execute the designated task according to the recognition result, and to store the evaluated cost in the task database 204 according to communication with the support server 200.

The second processing element 120 is configured to recognize whether the cost of the self robot R stored in the task database 204 is the lowest in a robot group containing other robots according to communication with the support server 200, and to control the motions of the self robot R so as to execute the designated task on a condition that the cost thereof has been recognized to be the lowest.

The support server 200 as illustrated in FIG. 3 (composed of a CPU, a ROM, a RAM, an I/O and so forth) can communicate with each of the plural robots R via a base station (not shown) and a communication network. As illustrated in FIG. 1, the support server 200 may be composed of a computer independent from each robot R, or may be composed of one computer mounted on one robot or plural computers mounted on plural robots (for example, a main robot to be described hereinafter) R. The support server 200 is provided with the task database 204. The task database 204 stores the content of each of the plurality of tasks containing the designated task and the cost evaluated by each robot R. The content of a task includes whether there is a robot designated as an execution subject of the task, identification information of the designated robot, a priority level of the task and so forth. Various functions of the task execution system with the aforementioned configuration will be described hereinafter. Firstly, a bid procedure, namely, a procedure in which the cost for executing the designated task is evaluated for each robot R and the evaluated cost is stored in the task database 204 provided in the support server 200 will be described.

Figure 4:
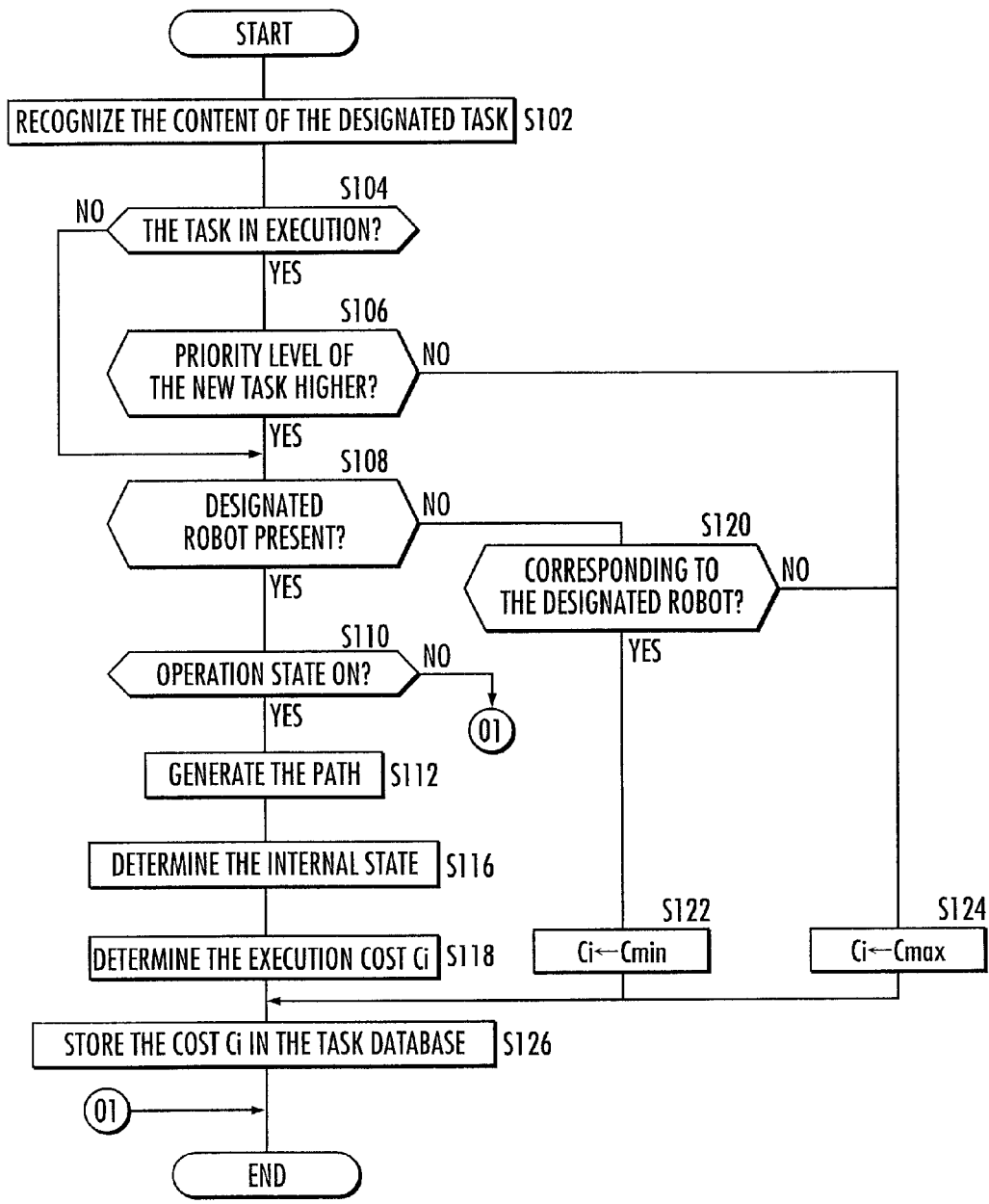
FIG. 4 is a flow chart related to a bid procedure in the task execution system.

The content of the designated task stored in the task database 204 is retrieved by the first processing element 110 according to communication with the support server 200 (FIG. 4/S102). For example, illustrated in FIG. 9(a) is a first task of moving a wagon W on which a first tray $T_1$ and a second $T_2$ are placed; illustrated in FIG. 9(b) is a second task of fetching up the first tray $T_1$ from the wagon W, transporting the first tray $T_1$ to a table Tb and disposing it on the table Tb; and illustrated in FIG. 9(c) is a third task of fetching up the second tray $T_2$ from the wagon W, transporting the second tray $T_2$ to the table Tb and disposing it on the table Tb. The content of a part of or the entire part of the three tasks is retrieved as the content of the designated task. If a plurality of tasks are defined by dividing one task into a first task, a second task, a third task and so forth, it is acceptable to define a part of or the entire part of the plurality of tasks which are not executed as the designated task.

Thereafter, whether the robot R is executing another task is determined on the basis of a task execution flag or the like stored in a storing device (FIG. 4/S104). If it is determined that the robot R is executing the other task (FIG. 4/S104 . . . YES), then, whether the priority level of the designated task is higher than the priority level of the task being executed is determined (FIG. 4/S106). If it is determined that the robot R is not executing the other task (FIG. 4/S104 . . . NO) or the priority level of the designated task is higher than the priority level of the task being executed (FIG. 4/S106 . . . YES), whether there is a robot being designated as the execution subject for the designated task is determined (FIG. 4/S108). If it is determined that the designated robot is not present (FIG. 4/S108 . . . YES), whether the operation state of the robot R is set at the ON state which is ready for executing the designated task or at the OFF state which is not ready for executing the designated task is determined according to a flag or the like stored in the storing device (FIG. 4/S110).

Figure 6:
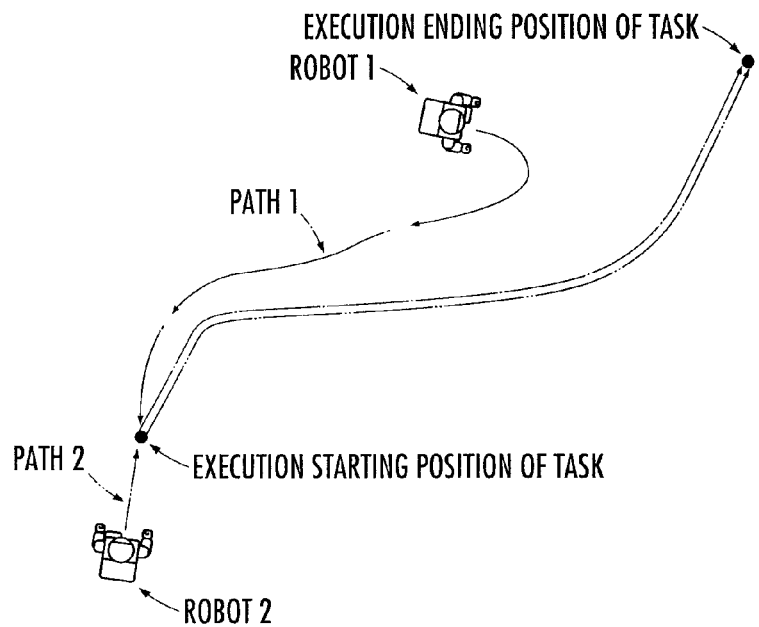
FIG. 6 is an explanatory diagram related to generation of a path.

If it is determined that the operation state of the robot R is set at the ON state (FIG. 4/S110 . . . YES), as illustrated in FIG. 6, a path from the present position (or an estimated position at the execution starting time of a task) of the robot R to an execution starting position of the task and a path from the execution starting position to an execution ending position are generated (FIG. 4/S112). If a task can be executed without the need of making displacements, such as recognizing a human, outputting audio voices or addressing a greeting on the basis of the recognition result, the execution starting position and the execution ending position are the same. The present position ((latitude, longitude) or (latitude, longitude, altitude)) of the robot R can be determined according to GPS signals received from a satellite by a GPS receiver (not shown) serving as the internal state sensor 111 or output signals from a gyro sensor or an acceleration sensor serving as the internal state sensor 111. The execution starting position and end position of a task can be recognized on the basis of the task information. Map information indicating a position ((latitude, longitude) or (latitude, longitude, altitude)) of a passable node or a passable region or the like is used in generating the path. The path is formed from one or plural links joining the nodes contained in the map information. The map information may be stored in a map database disposed in the support server 200 to be distributed from the support server 200 to each robot R, or may be preliminarily stored in a map database disposed in the controller 100. It is acceptable that a path from the execution starting position to the execution ending position is generated differently for each robot R.

Figure 7:
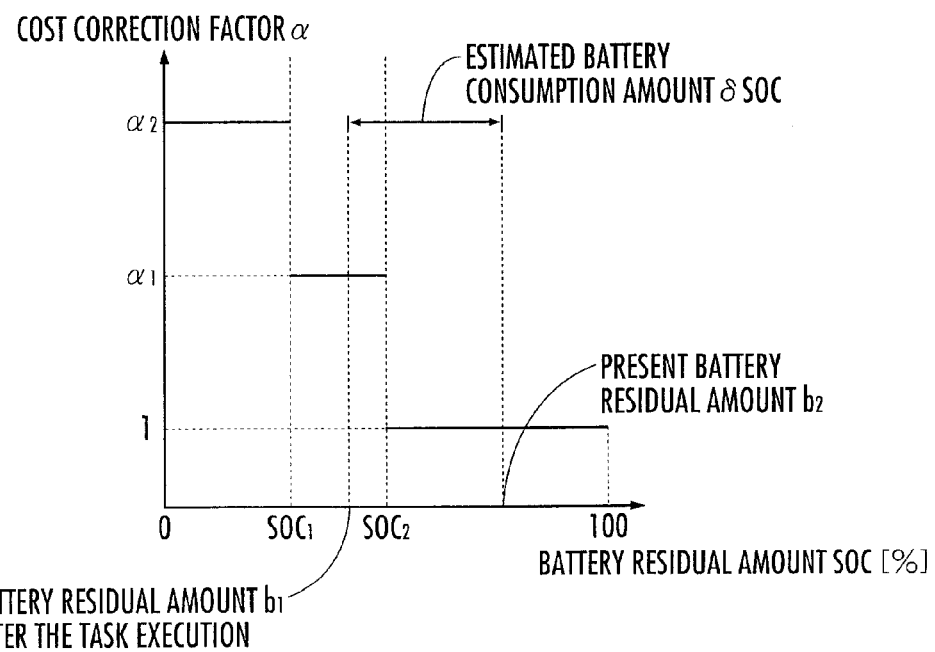
FIG. 7 is an explanatory diagram related to a cost evaluation method.

Thereafter, the first processing element 110 determines an internal state of the robot R on the basis of output signals from the internal state sensor 111 (FIG. 4/S116). A battery residual amount (remained energy) of a battery serving as the energy source of the robot R, an orientation or posture of the robot R such as the robot R is facing to the northwestern direction and the like are determined as the internal state. Subsequently, on the basis of the determination result on the internal state of the robot R, an execution cost $c_i$ (i: identification information for the robot R) indicating a labor or load required for the robot R to execute the task while moving along the generated path is evaluated (FIG. 4/S118). The longer the generated path is, the longer an estimated time required for moving along the generated path, or the greater an estimated battery consumption amount required for moving or altering orientations while executing the task along the generated path, the execution cost $c_i$ will be evaluated higher. In addition, the less an estimated battery residual amount after the robot R has executed the task is, the higher the execution cost $c_i$ will be evaluated. Specifically, as illustrated in FIG. 7, the less the battery residual amount SOC becomes, the higher the execution cost $c_i$ will be estimated by using a stepwise-greater correction factor α. The correction factor α is a function of the battery residual amount SOC defined by the equation (1), and is preliminarily stored in the memory of the controller 100. The correction factor a may be defined as not only a discontinuous decreasing function with the battery residual amount SOC as a variant but also a continuous decreasing function with the battery residual amount SOC as the variant.

$$\alpha \equiv \alpha_2 \ (SOC = 0 \sim SOC_1),$$

$$\alpha_1 (<\alpha 2) \ (SOC = SOC_1 \sim SOC_2),$$

$$1(<\alpha_1) \ (SOC = SOC_2 \sim 100) \quad (1)$$

As illustrated in FIG. 7, the present battery residual amount is denoted as $b_2$ ($SOC_2 < b_2 < 100$) and the estimated battery residual amount after executing the task is denoted as $b_1$ ($SOC_1 < b_1 < SOC_2$). Generally, the estimated battery consumption amount $\delta SOC$ is simply equal to ($b_2-b_1$). However, since the estimated battery residual amount $b_1$ will be more consumed in a residual region where the correction factor $\alpha$ has a value $\alpha_1$ greater than 1, thus, the estimated battery consumption amount $\delta SOC$ is evaluated higher correspondingly by using the correction factor a according to the equation (2).

$$\delta SOC = b_2 - SOC_2 + \alpha_1 (SOC_2 - b_1) \qquad (2)$$

Similarly, in a situation where the present battery residual amount is denoted as $b_2$ ($SOC_2 < b_2 < 100$) and the estimated battery residual amount after executing the task is denoted as $b_1$ ($0 < b_1 < SOC_1$), since the estimated battery residual amount $b_1$ will be more consumed in a residual region where the correction factor a has a value $\alpha_2$ greater than $\alpha_1$ (>1), thus, the estimated battery consumption amount $\delta SOC$ is evaluated higher correspondingly according to the equation (3).

$$\delta SOC = b_2 - SOC_2 + \alpha_1 (SOC_2 - SOC_1) + \alpha_2 (SOC_1 - b_1) \qquad (3)$$

It is also acceptable to evaluate the execution cost according to the following way: the position of an obstacle such as a human or another robot R in the ambient of the robot R is recognized by the external state sensor 112; thereafter, the contacting possibility with the obstacle when executing a task along a generated path is evaluated; the higher the contacting possibility is, the higher the execution cost will be evaluated.

Figure 8:
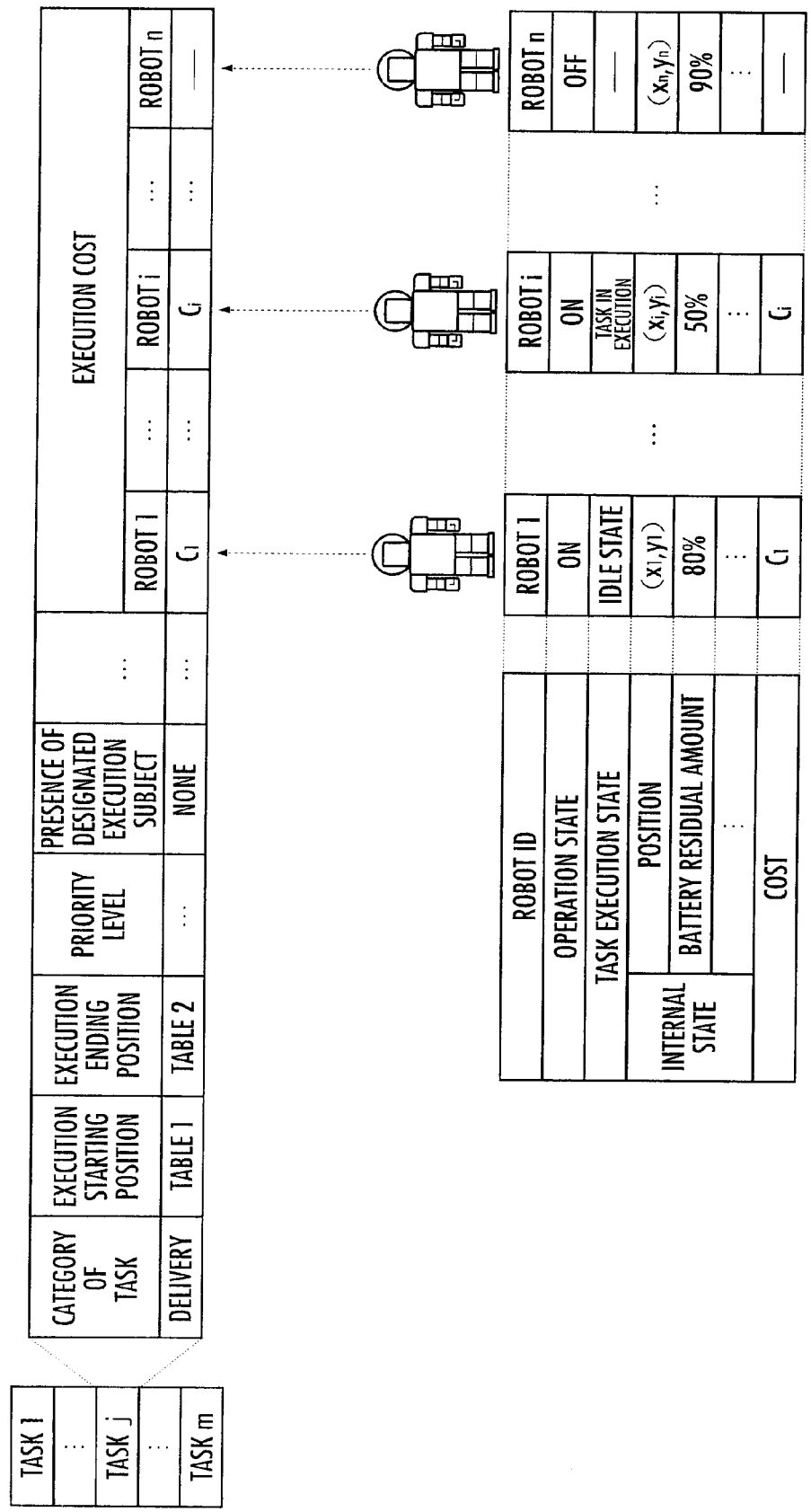
FIG. 8 is a diagram related to task information stored in the task database.

If the designated robot is determined to be present as the execution subject for the designated task (FIG. 4/S108 . . . NO), whether the robot R is corresponding to the designated robot is further determined (FIG. 4/S120). Whether the robot R is corresponding to the designated robot can be determined according to whether the identification information included in the task information for the designated robot is consistent to the identification information preliminarily store in the storing device for the robot R or the like. If it is determined that the robot R is corresponding to the designated robot (FIG. 4/S120 . . . YES), the execution cost $c_i$ is evaluated as the lowest cost $c_{min}$ (a predefined value such as zero for making the execution cost $c_i$ equal to the lowest bid price) (FIG. 4/S122). If it is determined that the robot R is not corresponding to the designated robot (FIG. 4/S120 . . . NO), the execution cost $c_i$ for the designated task is evaluated as the highest cost $c_{max}$ (a predefined value for making the execution cost $c_i$ equal to the highest bid price) (FIG. 4/S124). In addition, if it is determined that the priority level of the designated task is equal to or lower than the priority level of the other task being executed (FIG. 4/S106 . . . NO), the cost $c_i$ is evaluated as the highest cost $c_{max}$ (FIG. 4/S124). Thereafter, the cost $c_i$ and the identification information for the robot R are stored in the task database 204 by the first processing element 110 via communication with the support server 200 (FIG. 4/S126). If it is determined that the operation state of the robot R is set at the OFF state (FIG. 4/S110 . . . NO), the procedure is terminated without performing the bid of cost. As illustrated in FIG. 8, according to the bid performed by each of the plurality of robots R, the cost $c_i$ (i=1~n) for each designated task j evaluated for each robot R is stored in the task database 204. If there are plural robots R and each has the lowest cost $c_i$, the cost $c_i$ for each of the plural robots R may be adjusted so that only the cost $c_i$ for one robot R will be the lowest according to the priority level attached to each robot R by the support server 200. Moreover, since the execution cost $c_i$ is not evaluated for a robot R whose operation state is set at the OFF state, the cost $c_i$ for this robot R will not be stored in the task database 204.

Hereinafter, a contract procedure, namely, a procedure in which the designated task is executed by a robot R with the lowest cost $c_i$ will be described.

Figure 5:
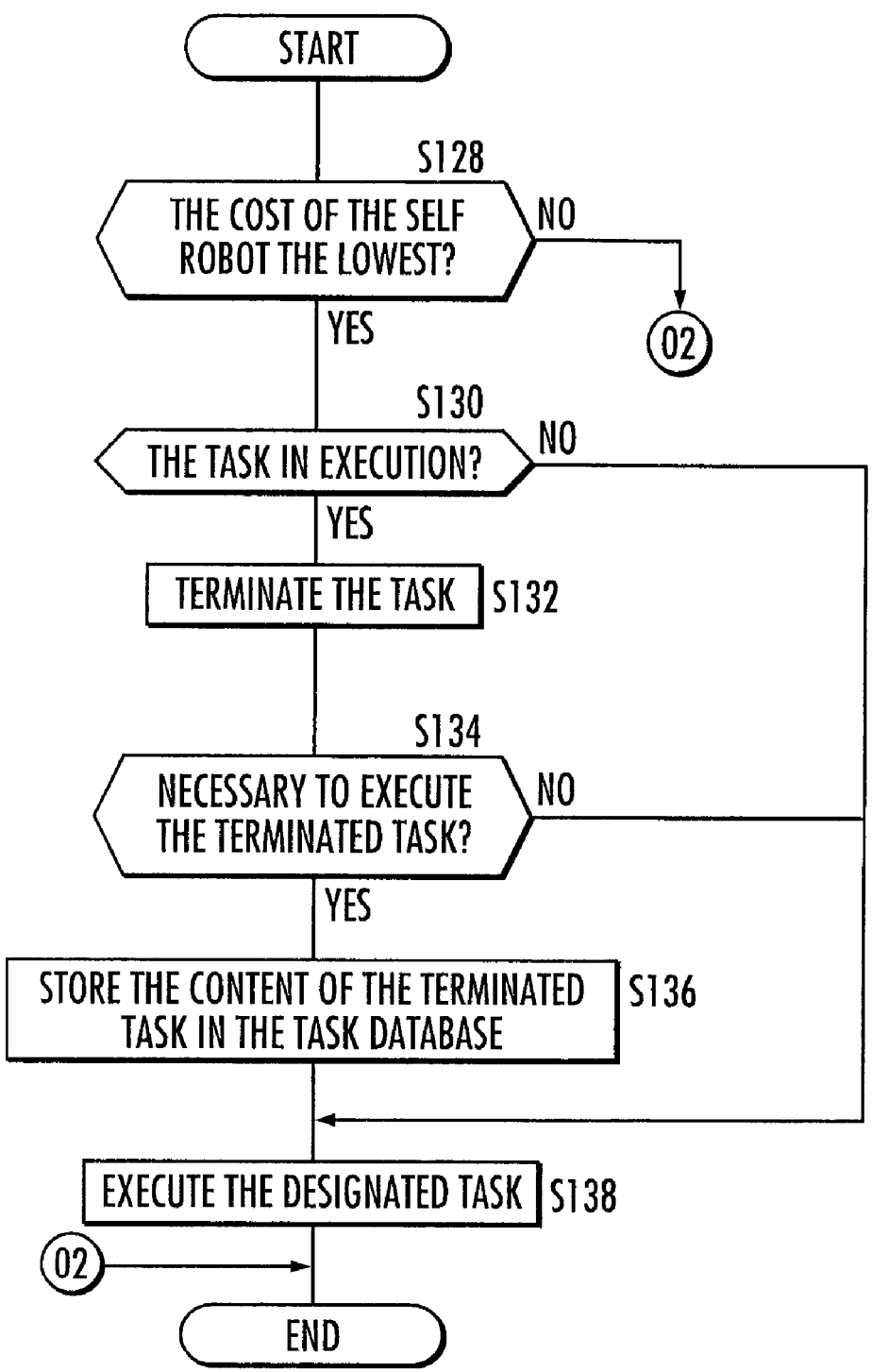
FIG. 5 is a flow chart related to a contract procedure in the task execution system.

The second processing element 120 determines whether the cost $c_i$ for the self robot R is the lowest according to communication with the support server 200 (FIG. 5/S128). If it is determined that the cost $c_i$ for the self robot R is the lowest (FIG. 5/S128 . . . YES), whether the robot R is executing another task is determined (FIG. 5/S130). If it is determined that the robot is executing the other task (FIG. 5/S130 . . . YES), the robot R is controlled to terminate the task in execution (FIG. 5/S132). Subsequently, whether it is necessary to execute the terminated task is determined (FIG. 5/S134). If it is determined that it is necessary to execute the terminated task (FIG. 5/5134 . . . YES), the content of the terminated task is stored in the task database 204 according to communication with the support server 200 (FIG. 5/S136). Thereby, a part of or the entire part of the content of the terminated task is stored in the task database 204. The terminated task may serve as a new designated task. Thereafter, the robot R is controlled to execute the designated task (FIG. 5/S138). Accordingly, the robot R executes a task by moving to a first table (execution starting position) included in the task along a generated path, operating the arms 12 and the hands 14 to fetch a tray on the first table, transporting the tray along the remained path to a second table (execution ending position) and disposing the tray on the second table. Further, the robot R can execute a task by gripping a wagon with a luggage disposed thereon at a first location (execution starting position), pushing the wagon along a generated path to transport it to a second location (execution ending position). Furthermore, the robot R can recognize or authorize a guest at the guest reception (execution starting position) according to output signals from the external state sensor 112, move the head 11 to perform greeting motions such as explanation or the like, and guide the guest to the reception room (execution ending position). On the other hand, if it is determined that the robot R is not executing a task (FIG. 5/S130 . . . NO) or it is not necessary to re-execute the terminated task (FIG. 5/S134 . . . NO), the robot R is controlled to execute the designated task (FIG. 5/S138).

According to the robot R with the aforementioned functions, the cost $c_i$ indicating the labor or load required for executing a designated task (for example, a task serving as a factor which alters the states of a plurality of tasks) is evaluated according to the internal state and the like (refer to FIGS. 4/S116, S118, S122 and S124). The cost $c_i$ is stored in the task database 204 disposed in the support server 200 (refer to FIG. 4/S126). If it is recognized that the cost $c_i$ of the self robot R is the lowest in the plurality of robots R stored in the task database 204, the robot R is controlled to execute the designated task. The evaluation of the cost for the plurality of robots and the storage thereof in the task database 204 disposed in the support server 200 may be deemed as a bid for executing the designated task by the plurality of robots R with the cost as a bid price. The execution of the designated task by a robot R with the lowest cost in the plurality of robots R may be deemed as a contract for executing the designated task by the robot R. Through performing the bid and contract of the designated task, the designated task can be executed by an appropriate robot R in the plurality of robots R from the viewpoint of execution economy of the designated task. Thereby, the robot R can execute the designated task in an appropriate condition from the viewpoint of execution economy for the designated task even though the state thereof is altered.

Figure 10:
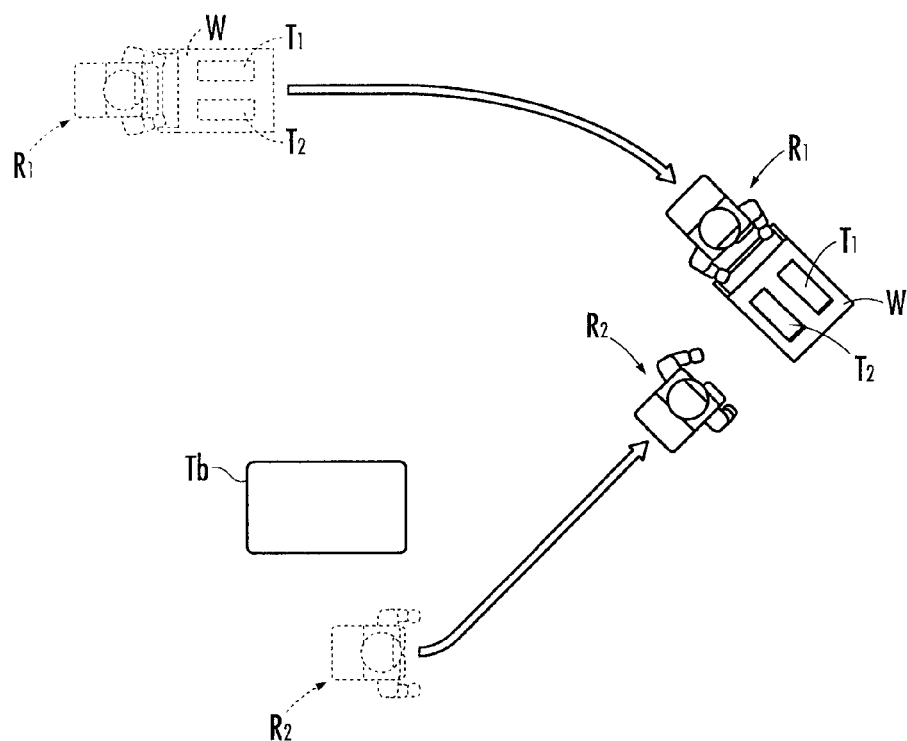
FIG. 10(a) and FIG. 10(b) are diagrams related to a task shared by a plurality of robots (Example 1).
Figure 10:
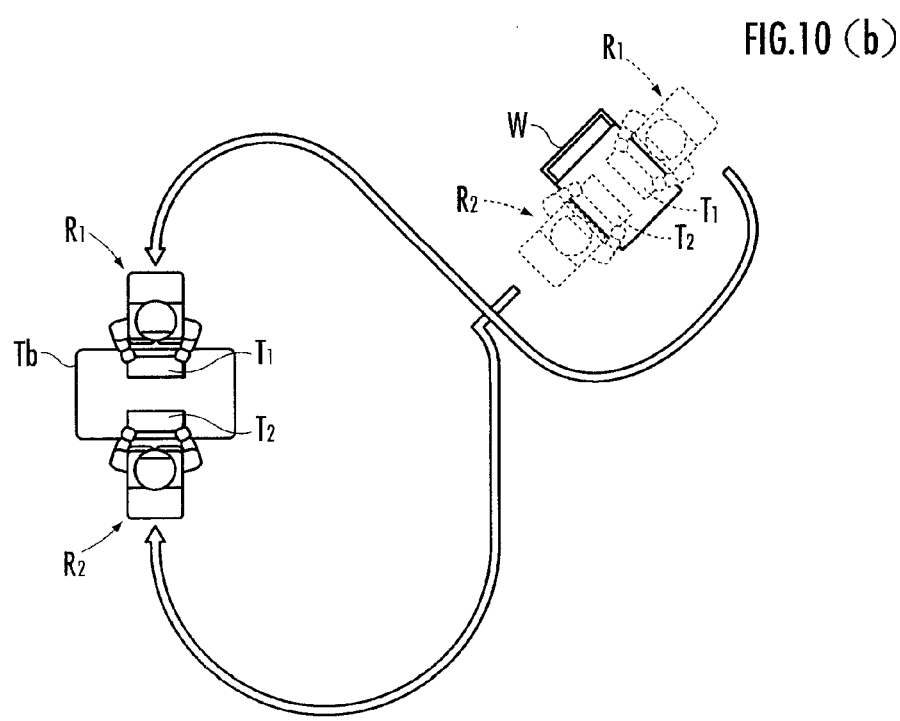
Figure 11:
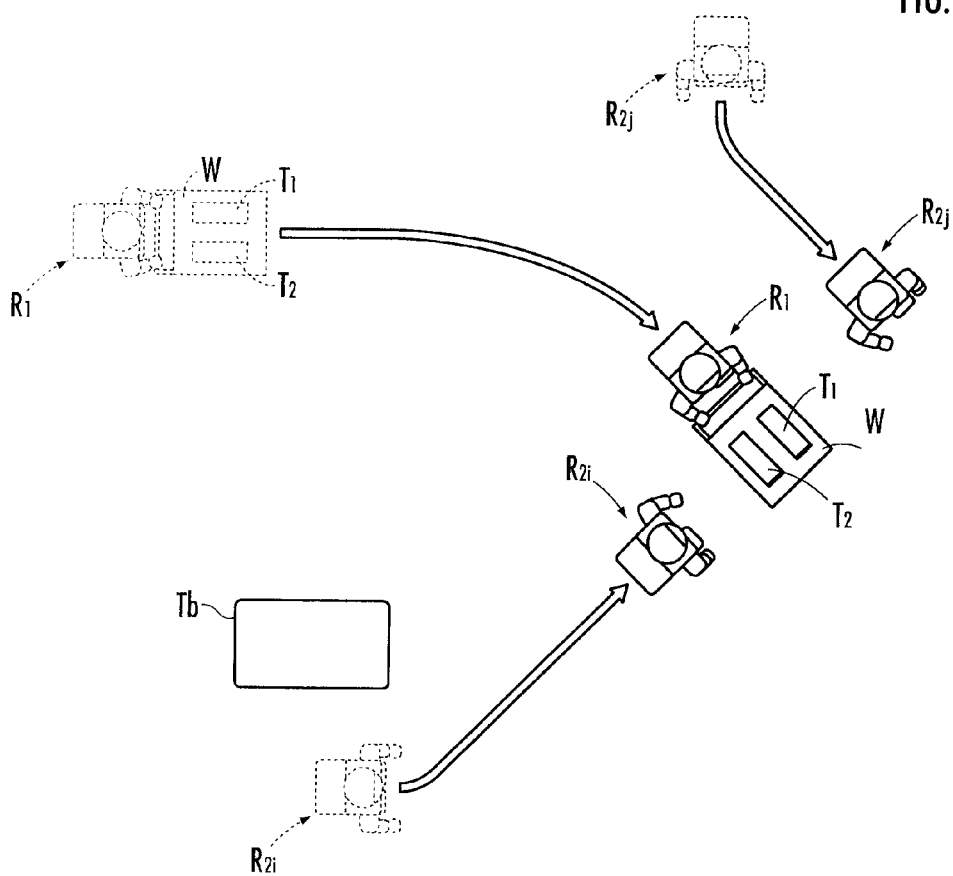
FIG. 11(a) and FIG. 11(b) are diagrams related to a task shared by a plurality of robots (Example 2).
Figure 11:
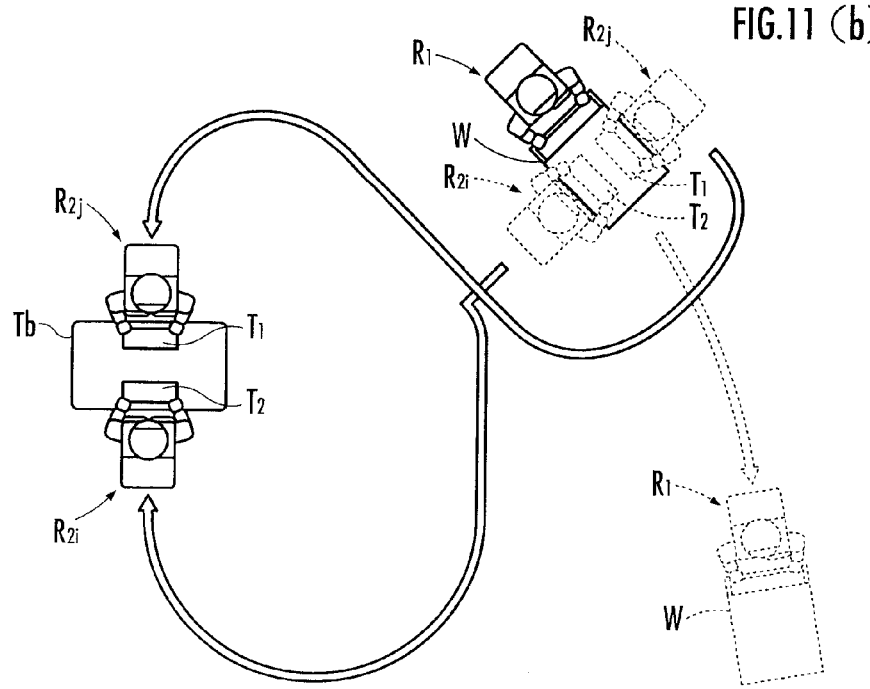

For example, among the first task, the second task and the third task illustrated in FIG. 9(a) to FIG. 9(c), respectively, the third task serving as the designated task can be executed by the second robot $R_2$ in place of the first robot $R_1$. In this situation, as illustrated in FIG. 10(a), the second robot $R_2$ serving as the execution subject for the third task moves toward the parking position of the wagon W serving as the estimated execution ending position of the first task by the first robot $R_1$. After the first robot $R_1$ has executed the first task, as illustrated in FIG. 10(b), while the second task is executed by the first robot $R_1$, the third task is executed by the second robot $R_2$. Moreover, among the first task, the second task and the third task, the second task and the third task serving as the designated tasks can be executed by the second robots $R_{2i}$ and $R_{2j}$, respectively, in place of the first robot $R_1$. In this situation, as illustrated in FIG. 11(a), the second robots $R_{2i}$ and $R_{2j}$ designated as the execution subjects for the second task and the third task, respectively, move toward the parking position of the wagon W serving as the estimated execution ending position of the first task by the first robot $R_1$. After the first robot $R_1$ has executed the first task, as illustrated in FIG. 11(b), while the second task is executed by the second robot $R_{2i}$, the third task is executed by the second robot $R_{2j}$. After the first tray $T_1$ has been transported away from the wagon W by the second robot $R_{2i}$ and the second tray $T_2$ has been transported away from the wagon W by the second robot $R_{2j}$, as illustrated by dashed lines in FIG. 11(b), the first robot $R_1$ (it may serve as the second robot $R_2$ if necessary) can execute a further task such as moving the wagon W or the like. Thereby, it is expected to alleviate the labor from the robot $R_1$ by making full use of the second robot $R_2$ and through the assistance on the task execution from the second robot $R_2$. In the example illustrated in FIG. 10(a) and FIG. 10(b), it is possible to economically alleviate the labor for the first robot $R_1$ to return from the position of the table Tb serving as the execution ending position of the second task to the parking position of the wagon W serving as the execution starting position of the third task. In the example illustrated in FIG. 11(a) and FIG. 11(b), it is possible to economically decrease the labor for the first robot $R_1$ to alter the direction thereof by moving to the lateral side of the wagon W before initiating the second task.

The first processing element 110 determines the position of the robot R, calculates the travel distance for the robot to move from the determined position to the execution starting position or to the execution ending position via the execution starting position, and evaluates the cost $c_i$ higher if the travel distance is longer (refer to FIG. 6). Thereby, if the travel distance to the execution starting position of a designated task or to the execution ending position of the designated task via the execution starting position thereof is shorter than the travel distance by another robots R, the robot R can execute the designated task by priority over the other robot R. On the contrary, if the travel distance is longer than the travel distance by another robot R, the robot R can be prevented from executing the designated task. Thus, it is possible for the robot R to execute the designated task in an appropriate condition from the viewpoint of shortening the travel distance for executing the designated task.

If it is determined by the first processing element 110 that the robot R is executing another task, the cost $c_i$ for executing the designated task will be evaluated higher than that when it is determined that the robot is not executing another task (refer to FIG. 4/S104, S118 and S124). Thereby, the robot R can execute the designated task when the robot R is not executing the other task different from the designated task by priority over when the robot R is executing the other task. Thus, it is possible for the robot R to execute the designated task in an appropriate condition from the viewpoint of concentrating on the designated task.

If the priority level of the designated task is determined by the first processing element 110 to be lower than the priority level of another task, the cost $c_i$ is evaluated higher than that when the priority level of the designated task is determined to be higher than the priority level of the other task (refer to FIG. 4/S106, S118 and S124). Thereby, if the robot R is executing the other task and the priority level of the other task is lower than the priority level of the designated task, the robot R can be assigned to execute the designated task. Thus, it is possible for the robot R to execute the designated task in an appropriate condition from the viewpoint of executing a task with higher priority level preferentially.

If the robot R is determined by the first processing element 110 to be corresponding to a designated robot serving as the execution subject of the designated task, the cost $c_i$ is evaluated higher than that when the robot is determined not to be corresponding to the designated robot (refer to FIG. 4/S120, S122 and S124). Thereby, it is possible for the robot R to execute the designated task in a condition appropriate for the execution subject of the designated task in consideration of a specification or the like.

The battery residual amount (energy residual amount) SOC of the robot R after executing the task is estimated by the first processing element 110, the cost $c_i$ will be evaluated higher as the battery residual amount becomes less (refer to the equations (1) to (3), FIG. 4/S116, S118 and FIG. 7). Thereby, when the robot R has more battery residual amount estimated after executing a designated task, the robot R can execute a new designated task by priority over the other robot R with less battery residual amount. On the contrary, when robot R has less battery residual amount than the other robot R, the robot R can be prevented from executing the designated task. Thereby, it is possible for the robot R to execute the designated task in an appropriate condition from the viewpoint of assuring sufficient energy for executing a new task after the execution of the designated task.

The robot constituting the task execution system may be a robot different from the robot R described in the aforementioned embodiments or any device which can move autonomously, such as a trolley or the like. Moreover, the plurality of robots may be of different types, respectively.

It is acceptable to recognize an execution starting time for a designated task as the content thereof and evaluate an execution cost c for the designated task estimated at the execution starting time. For example, when the actions or motions of the robot R are controlled according to a motion plan (defined by a trajectory of representative points or a temporal variation behavior of angles for each joint), a behavior state of the robot R at an estimated execution starting time, such as a position, an orientation and a travel velocity thereof, or whether the operation state is set at the ON state or OFF state can be estimated according to the motion plan. If the robot R is executing a task, the ending time for the task can be estimated according to a travel distance traveled to complete the task and the present travel velocity thereof. According to whether the estimated ending time is before or after the estimated starting time for the designated task, whether or not the task is still in execution can be estimated. According to the robot R with the mentioned configuration, through performing the bid and contract of the designated task according to the cost $c_i$ evaluated in relation to a predicted future state of the robot R, the robot R can execute the designated task in an appropriate condition from the viewpoint of execution economy of the task.

It is acceptable that after the first processing element 110 disposed in the robot R has determined that the robot R is executing another task (refer to FIG. 4/S104), it determines whether a remained part of the other task is equal to or greater than a reference value, and evaluates higher the cost $c_i$ when it is determined that the remained part of the other task is less than the reference value than the cost $c_i$ when it is determined that the remained part of the other task is equal to or greater than the reference value. The battery consumption amount required for completing the task in execution, the remained travel distance or the like may be calculated as the remained part of the task. Thereby, when the robot R is executing another task different from the designated task, but the other task can be completed in a short time, the robot R can be assigned to execute the designated task. Therefore, the robot R can execute the designated task in an appropriate condition from the viewpoint of efficiently executing the task which is being executed and the designated task continuously.

It is also acceptable to evaluate the execution cost $c_i$ for a designated task assigned to each robot R in the following method. Firstly, the cost of a scheduled execution task to the robot R after the execution duration of a designated task is evaluated respectively in two conditions: whether the designated task has been executed or has not been executed. The execution cost $c_i$ of the designated task is evaluated higher continuously or discontinuously as the cost of the scheduled execution task when the designated task has been executed becomes higher than the cost of the scheduled execution task when the designated task is not executed. On the contrary, the execution cost $c_i$ of the designated task is evaluated lower continuously or discontinuously as the cost of the scheduled execution task when the designated task has been executed becomes lower than the cost of the scheduled execution task when the designated task is not executed. Accordingly, if the cost of the scheduled execution task when the designated task has been executed becomes lower than the cost of the scheduled execution task when the designated task is not executed, the robot R can execute the designated task by priority over the case when the cost becomes higher. On the other hand, if the cost of the scheduled execution task when the designated task is not executed becomes lower than the cost of the scheduled execution task when the designated task has been executed, the robot R can execute the designated task by priority over the case when the cost becomes higher. Thereby, the robot R can execute the designated task before the scheduled execution task in an appropriate condition from the viewpoint of executing the scheduled execution task at a lower cost.

It is also acceptable that the first processing element 110 stores the cost for executing the designated task by the self robot R in the task database 204 on a condition that the cost indicating the labor or load required for the self robot R to execute the designated task is equal to or less than the first threshold. Thereby, each robot R can be prevented from executing the designated task in spite of over-labor or over-load.

It is also acceptable that the first processing element 110 evaluates the labor or load required for the self robot R to execute a scheduled execution task as a second cost, and stores the content of the scheduled execution task as the content of the designated task in the task database 204 according to communication with the support server 200 on a condition that the second cost is equal to or higher than a second threshold. Thus, as aforementioned, the scheduled execution task by the self robot R becomes the subject of bid and contract for another robot R. Thereby, a task possibly consuming excessive labor from the self robot R may be executed by another appropriate robot R in place of the self robot R from the viewpoint of executing economy.

In the aforementioned embodiment, whether the cost indicating a labor or load required for the self robot R to execute a designated task is the lowest in a robot group including another robot R is determined by each robot R (refer to FIG. 5/S128); however, it is acceptable for the support server 200 to select a robot R with the lowest cost from the robot group (determine a contractor of a designated task), transmit the selection result or bid result from the support server 200 to the selected robot R, and cause the selected robot R to recognize that the cost of the self robot is the lowest.

What is claimed is:

1. A robot including a controller which controls the robot to execute a task by making autonomous motions according to communication with a support server provided with a task database, the controller comprising:
    a first processing element configured to: communicate with the support server and recognize a content of a designated task among a plurality of tasks stored in the task database; evaluate a cost indicating a labor or load required for the robot to execute the designated task; communicate with the support server and store the evaluated cost for the robot to execute the designated task in the task database; evaluate the cost of a scheduled execution task for the robot when the designated task has been executed and evaluate the cost of the scheduled execution task for the robot when the designated task is not executed after an execution duration of the designated task, respectively; evaluate the cost for the robot to execute the designated task to continuously or stepwisely increase as the cost of the scheduled execution task when the designated task has been executed becomes higher as compared to the cost of the scheduled execution task when the designated task is not executed; and evaluate the cost for the robot to execute the designated task to continuously or step-wisely decrease as the cost of the scheduled execution task when the designated task has been executed becomes lower as compared to the cost of the scheduled execution task when the designated task is not executed; and
    a second processing element configured to recognize whether the cost for the robot to execute the designated task stored in the task database is a lowest cost for execution of the designated task in a robot group containing other robots, and to control the motions of the robot to execute the designated task on a condition that the cost thereof has been recognized to be the lowest.

2. The robot according to claim 1, wherein the first processing element is further configured to recognize an execution starting time for the designated task as the content of the designated task, and to evaluate the cost predicted for executing the designated task at the execution starting time.

3. The robot according to claim 1, wherein the first processing element is further configured to
    recognize an execution starting position and an execution ending position for the designated task as the content of the designated task,
    determine a position of the robot,
    calculate a travel distance from the determined position of the robot to the execution starting position or the execution ending position of the designated task, and evaluate the cost for the robot to execute the designated task to continuously or step-wisely increase as the travel distance increases.

4. A robot including a controller which controls the robot to execute a task by making autonomous motions according to communication with a support server provided with a task database, the controller comprising:
a first processing element configured to: communicate with the support server and recognize a content of a designated task among a plurality of tasks stored in the task database; recognize whether the robot is executing another task different from the designated task; evaluate a cost indicating a labor or load required for the robot to execute the designated task, wherein the cost is evaluated to be higher when the robot is recognized to be executing the other task different from the designated task as compared to when the robot is not recognized to be executing the other task different from the designated task; and communicate with the support server and store the evaluated cost in the task database; and
a second processing element configured to recognize whether the cost for the robot to execute the designated task stored in the task database is a lowest cost for execution of the designated task in a robot group containing other robots, and to control the motions of the robot to execute the designated task on a condition that the cost therefore has been recognized to be the lowest, wherein the first processing element is further configured to recognize a priority level of the designated task as the content thereof, when the robot is recognized to be executing the other task different from the designated task, to recognize whether the priority level of the designated task is higher than a priority level of the other task being executed by the robot, and to evaluate the cost of the robot to execute the designated task to be higher when the priority level of the designated task is lower than the priority level of the other task as compared to the cost when the priority level of the designated task is higher than the priority level of the other task.

5. The robot according to claim 4, wherein the first processing element is further configured
when the robot is recognized to be executing the other task different from the designated task, to recognize whether a remained part of the other task being executed by the robot is equal to or greater than a reference value, and
to evaluate the cost for the robot to execute the designated task to be higher when the remained part of the other task is less than the reference value as compared to the cost when the remained part of the other task is equal to or greater than the reference value.

6. The robot according to claim 1, wherein the first processing element is further configured to
recognize a designated robot which is an execution subject of the designated task as the content of the designated task,
recognize whether the robot corresponds to the designated robot, and
evaluate the cost for the robot to execute the designated task to be lower when the robot corresponds to the designated robot as compared to when the robot does not correspond to the designated robot.

7. The robot according to claim 1, wherein the first processing element is further configured to
estimate an energy residual of the robot after the execution of the task, and
evaluate the cost to continuously or step-wisely increase as the energy residual decreases.

8. The robot according to claim 1, wherein the first processing element is further configured to store the cost in the task database on a condition that the cost is equal to or greater than a first threshold.

9. The robot according to claim 1, wherein the first processing element is further configured to
evaluate the labor or load required for the self robot to execute a scheduled execution task as a second cost, and
store the content of the scheduled execution task as the content of the designated task in the task database according to communication with the support server on a condition that the second cost is equal to or higher than a second threshold.

10. A task execution system, comprising:
a support server provided with a task database, the task database storing a content of each of a plurality of tasks, and
a plurality of robots executing the plurality of tasks by making autonomous motions according to communication with the support server,
wherein
each of the plurality of robots is provided with a controller, the controller including:
a first processing element configured to: communicate with the support server and recognize a content of a designated task among the plurality of tasks stored in the task database; evaluate a cost indicating a labor or load required for the robot to execute the designated task; communicate with the support server and store the evaluated cost for the robot to execute the designated task in the task database; evaluate the cost of a scheduled execution task for the robot when the designated task has been executed and evaluate the cost of the scheduled execution task for the robot when the designated task is not executed after an execution duration of the designated task, respectively; evaluate the cost for the robot to execute the designated task to continuously or step-wisely increase as the cost of the scheduled execution task when the designated task has been executed becomes higher as compared to the cost of the scheduled execution task when the designated task is not executed; and evaluate the cost for the robot to execute the designated task to continuously or step-wisely decrease as the cost of the scheduled execution task when the designated task has been executed becomes lower as compared to the cost of the scheduled execution task when the designated task is not executed; and
a second processing element configured to communicate with the support server and recognize whether the cost for the robot to execute the designated task stored in the task database is a lowest cost for execution of the designated task as compared to the evaluated cost for execution of the designated task for other robots in the plurality of robots, and to control the motions of the robot to execute the designated task on a condition that the cost thereof has been recognized to be the lowest.

11. The task execution system according to claim 10, wherein the first processing element is further configured to
recognize whether the robot is executing another task different from the designated task,
evaluate the cost for the robot to execute the designated task such that the cost is evaluated to be higher when the robot is recognized to be executing the other task different from the designated task as compared to when the robot is not recognized to be executing the other task different from the designated task.

12. The task execution system according to claim 11, wherein the first processing element is further configured
to recognize a priority level of the designated task as the content thereof,
when the robot is recognized to be executing the other task different from the designated task, to recognize whether the priority level of the designated task is higher than a priority level of the other task being executed by the robot, and
to evaluate the cost for the robot to execute the designated task to be higher when the priority level of the designated task is lower than the priority level of the other task as compared to the cost when the priority level of the designated task is higher than the priority level of the other task.

13. The task execution system according to claim 11, wherein the first processing element is further configured
when the robot is recognized to be executing the other task different from the designated task, to recognize whether a remained part of the other task is equal to or greater than a reference value, and
to evaluate the cost for the robot to execute the designated task to be higher when the remained part of the other task is less than the reference value as compared to the cost when the remained part of the other task is equal to or greater than the reference value.

14. The task execution system according to claim 10, wherein the first processing element is further configured to
recognize a designated robot which is an execution subject of the designated task as the content of the designated task,
recognize whether the robot corresponds to the designated robot, and evaluate the cost for the robot to execute the designated task to be lower when the robot corresponds to the designated robot as compared to the cost when the robot does not correspond to the designated robot.

15. The robot according to claim 1, wherein the second processing element is configured to recognize whether the cost for the robot to execute the designated task stored in the task database is the lowest cost for execution of the designated task in the robot group containing other robots by comparing the cost for the robot to execute the designated task with costs for the other robots in the robot group to execute the designated task.

16. The robot according to claim 4, wherein the second processing element is configured to recognize whether the cost for the robot to execute the designated task stored in the task database is a lowest cost for execution of the designated task in a robot group containing other robots by comparing the cost for the robot to execute the designated task with costs for the other robots in the robot group to execute the designated task.

17. The robot according to claim 4, wherein the first processing element is further configured to
estimate an energy residual of a battery of the robot after execution of the designated task, and
evaluate the cost for the robot to execute the designated task to continuously or step-wisely increase as the estimated energy residual decreases.

18. The robot according to claim 4, wherein the first processing element is configured to recognize whether the robot is executing another task different from the designated task at a time of evaluating the cost for the robot to execute the designated task.

* * * * *